(12) United States Patent
Delaby et al.

(10) Patent No.: US 9,863,539 B2
(45) Date of Patent: Jan. 9, 2018

(54) BEARING, NOTABLY FOR A VEHICLE

(71) Applicants: Juliette Delaby, Charentenay (FR); Michel Nicolas, Annay la Côte (FR)

(72) Inventors: Juliette Delaby, Charentenay (FR); Michel Nicolas, Annay la Côte (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/066,591

(22) Filed: Mar. 10, 2016

(65) Prior Publication Data

US 2016/0273659 A1 Sep. 22, 2016

(30) Foreign Application Priority Data

Mar. 18, 2015 (FR) ...................................... 15 52228

(51) Int. Cl.
| | |
|---|---|
| *F16J 15/46* | (2006.01) |
| *F16C 33/78* | (2006.01) |
| *F16J 15/00* | (2006.01) |
| *F16J 15/34* | (2006.01) |
| *F16C 33/76* | (2006.01) |
| *F16C 19/16* | (2006.01) |

(52) U.S. Cl.
CPC .............. *F16J 15/46* (2013.01); *F16C 33/767* (2013.01); *F16C 33/782* (2013.01); *F16C 33/7896* (2013.01); *F16J 15/008* (2013.01); *F16J 15/3448* (2013.01); *F16C 19/166* (2013.01)

(58) Field of Classification Search
CPC ... F16J 15/46; F16C 33/7836; F16C 33/7846; E21B 4/003; F01D 11/00

USPC .......................................... 384/477–479, 481
See application file for complete search history.

(56) References Cited

U.S. PATENT DOCUMENTS

| | | | | | |
|---|---|---|---|---|---|
| 2,699,580 | A | * | 1/1955 | Smith | .................... B64C 1/1476 49/477.1 |
| 2,720,011 | A | * | 10/1955 | Krupp | .................... B64D 15/02 277/646 |
| 3,178,779 | A | * | 4/1965 | Clark | ........................ B64C 1/14 220/232 |
| 4,923,074 | A | * | 5/1990 | Johnston | ................ B60J 10/244 220/1.5 |
| 2011/0278851 | A1 | | 11/2011 | Fujioka et al. | |

FOREIGN PATENT DOCUMENTS

| | | |
|---|---|---|
| DE | 102009014214 A1 | 6/2010 |
| JP | 2014016025 A | 1/2014 |
| WO | 9201179 A1 | 1/1992 |

* cited by examiner

*Primary Examiner* — Kristina R Fulton
*Assistant Examiner* — Lakshmi S Koneru
(74) *Attorney, Agent, or Firm* — Bryan Peckjian; SKF USA Inc. Patent Dept.

(57) ABSTRACT

A bearing having an inner ring, an outer ring, and sealing means is provided. The bearing includes a complementary inflatable sealing device mounted on one of the rings and further includes a fixed annular part and a deformable annular portion coupled to the annular fixed part that can be deformed in a direction from a retracted position to a deployed position under the effect of a fluid and in the other direction towards its retracted position, at least one annular chamber for receiving the fluid, into which the orifice being formed between the fixed and deformable portions at least when the deformable annular portion is extended axially.

11 Claims, 4 Drawing Sheets

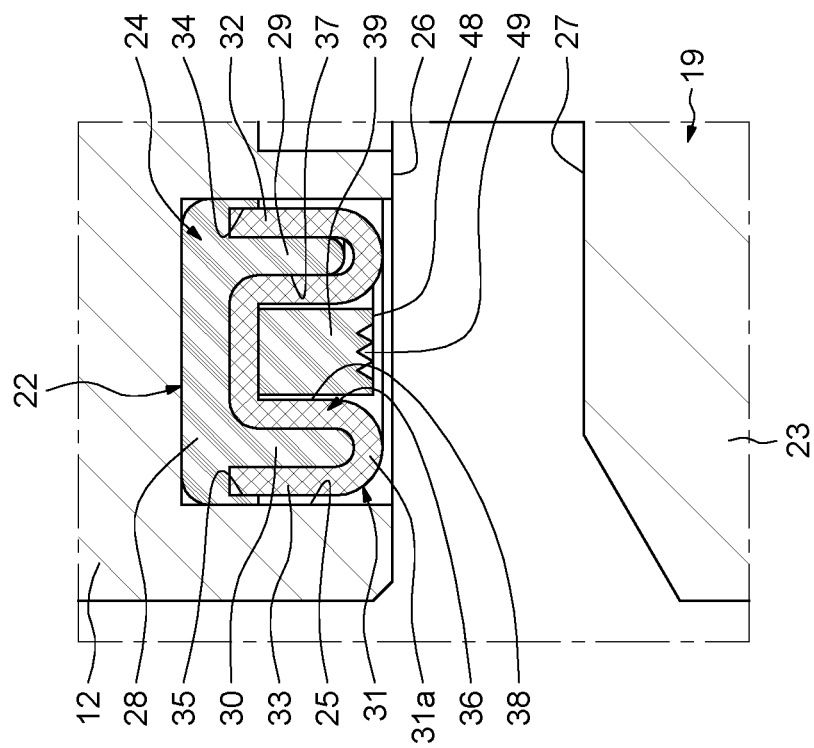

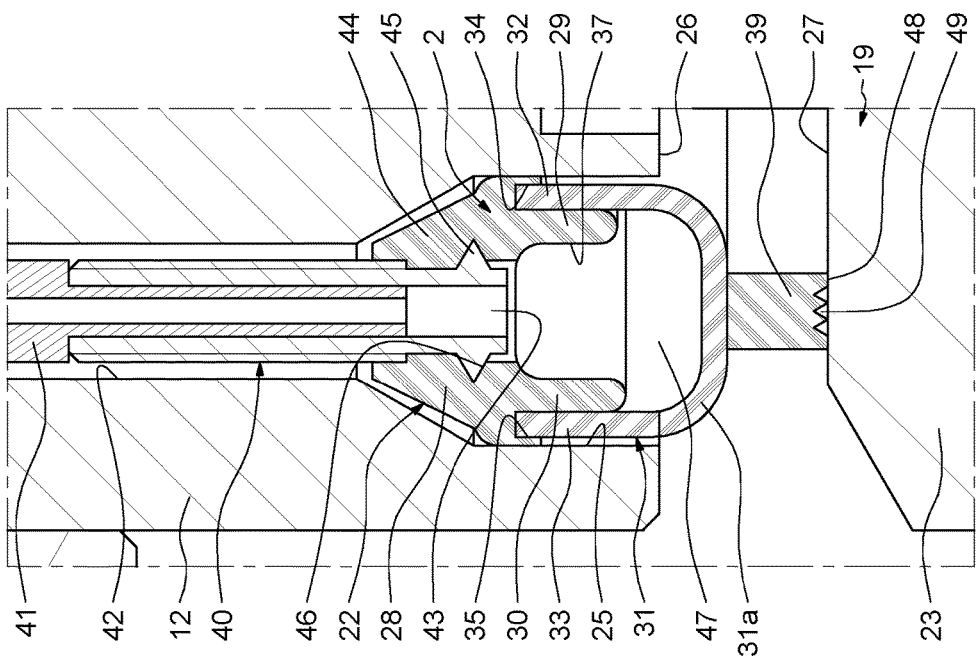
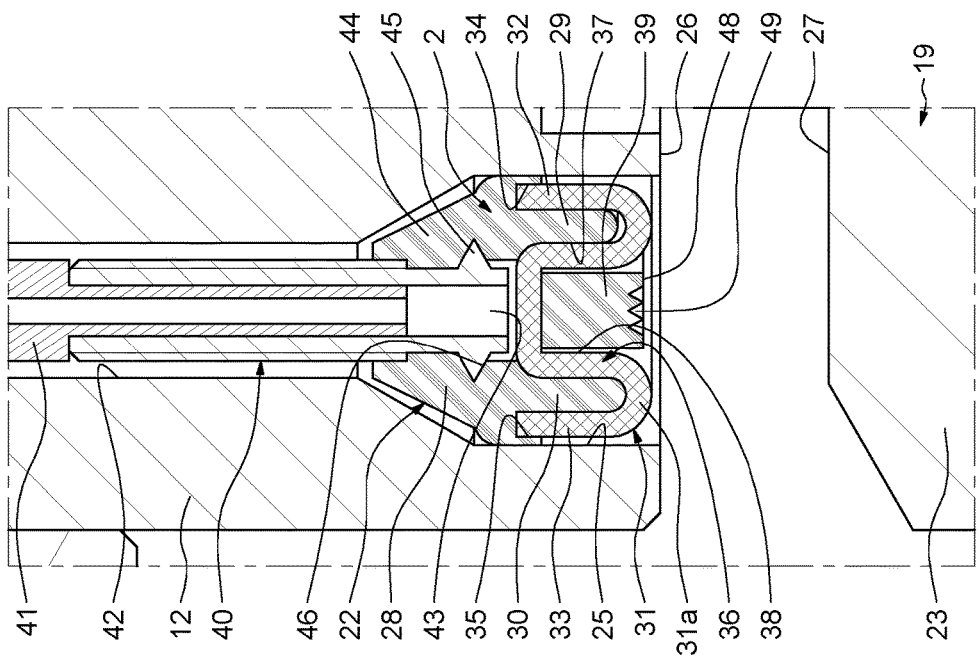

BEARING, NOTABLY FOR A VEHICLE

CROSS REFERENCE TO RELATED APPLICATION

This is a Non-Provisional Patent Application, filed under the Paris Convention, claiming the benefit of French (FR) Patent Application Number 1552228, filed on 18 Mar. 2015, which is incorporated herein by reference in its entirety.

TECHNICAL FIELD OF THE INVENTION

The present invention relates to the field of bearings. More particularly, the invention relates to the slewing bearings, of large diameter, capable of ensuring the rotation of a movable part relative to a fixed part, in particular those used in vehicles, particularly military.

BACKGROUND OF THE INVENTION

Such bearings generally comprise an inner ring, an outer ring, at least one row of rolling elements arranged between the rings and seals disposed between the rings to define a closed annular space within which the rolling elements are arranged. Under certain conditions of use, the sealing of such bearings, realized in this way, may be insufficient, particularly for use in a submersible vehicle or operating in an environment polluted for instance by gas or radiation.

SUMMARY OF THE INVENTION

The present invention aims to provide a rolling bearing, particularly for a vehicle, with an improved sealing and able to be adapted to different conditions of use and environment.

According to one embodiment, it is proposed a bearing comprising an inner ring, an outer ring, and sealing means. The bearing further includes a complementary sealing inflatable device mounted on one of the rings.

This sealing device includes a fixed annular portion having at least one orifice and a deformable annular portion coupled to the stationary annular portion. This deformable annular portion is adapted to axially deform in a direction from a retracted position to a deployed position under the effect of a fluid introduced through the opening and axially in the opposite direction towards its retracted position, at least one annular fluid receiving chamber, into which opens the orifice being formed between the fixed and deformable portions at least when the deformable annular portion is extended axially.

Thus, the sealing device can be used if necessary. The deformable annular portion may include a deformable annular membrane. The deformable annular portion may comprise a contact annular member secured to the annular deformable membrane.

According to a variant embodiment, the fixed annular portion may comprise spaced annular wings and an annular connecting branch connecting these wings, so as to form an annular groove, the orifice being provided in the annular connection branch. Further, the deformable annular membrane may include annular wings coupled to wings of the fixed annular portion and a deformable central annular portion connecting these wings.

In a particular embodiment, the central annular portion of the annular membrane may be adapted to be engaged, in the retracted position, in the annular groove of the stationary annular portion and adapted to extend axially outside the annular groove towards its deployed position.

The fixed annular portion may be advantageously mounted in an annular groove of the ring which bears the sealing device.

The sealing device may include a conduit having one end secured to the fixed annular portion and connected to the orifice.

According to a particular embodiment, the bearing may comprise a fluid source connected to the conduit and mounted on the ring carrying the sealing device.

In one particular arrangement, in the deployed position, the deformable annular portion may be adapted to come into contact with one face of the other ring. It is also proposed an assembly of two parts connected by means of a rolling bearing such as above, wherein the deformable annular portion of the sealing device, secured to one of the parts, is adapted to come, in the deployed position, in contact on an annular face of the other part.

BRIEF DESCRIPTION OF THE DRAWINGS

A rolling bearing provided with a sealing device will now be described by way of non-limiting exemplary embodiment, illustrated by the drawing in which:

FIG. 3 shows a half-sectional enlarged view of the sealing device in retracted position, in a different place other than that where is the conduit;

FIG. 4 shows an enlarged half-sectional view of the sealing device, corresponding to FIG. 1; and FIG. 5 shows an enlarged half-sectional view of the sealing device, corresponding to FIG. 2.

DETAILED DESCRIPTION OF THE INVENTION

Figure 1:
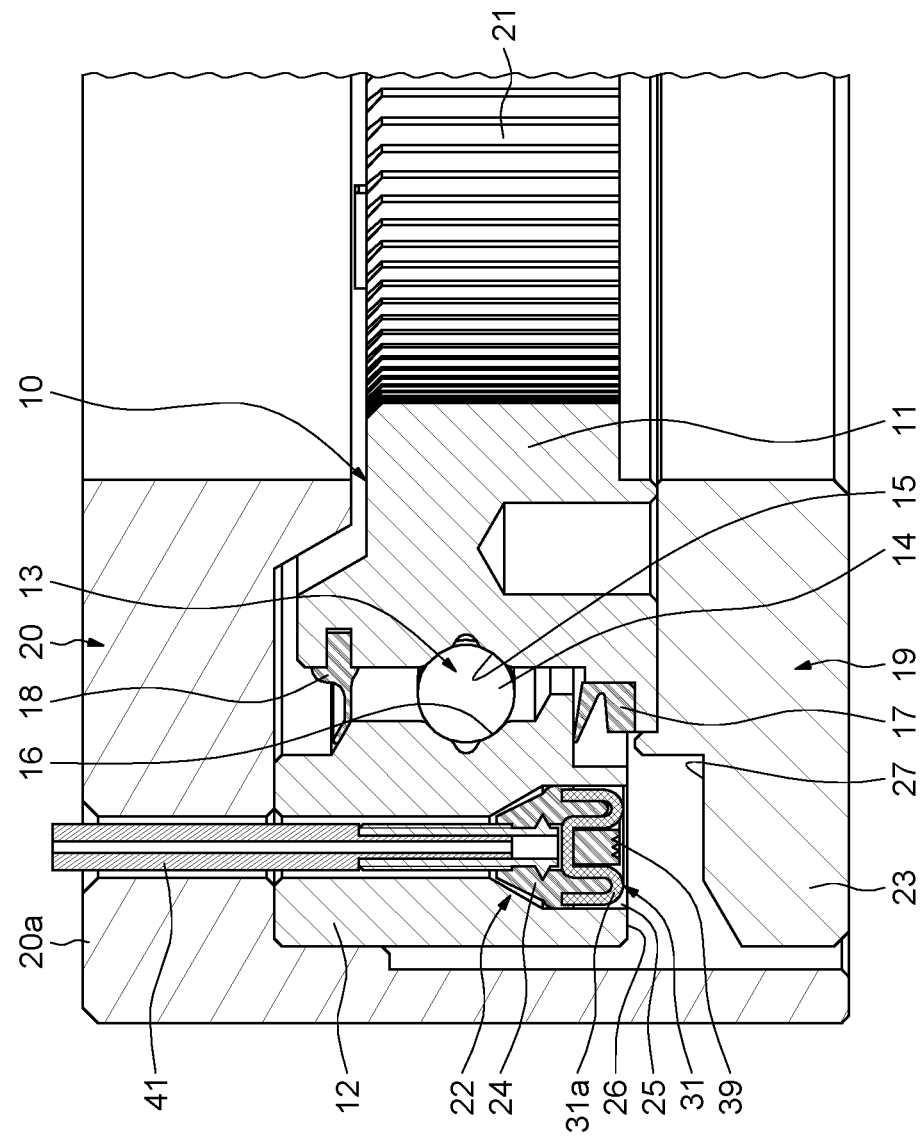
FIG. 1 shows a half-sectional view of the rolling bearing, passing through the axis of a conduit of the sealing device, the latter being in the retracted position.
Figure 2:
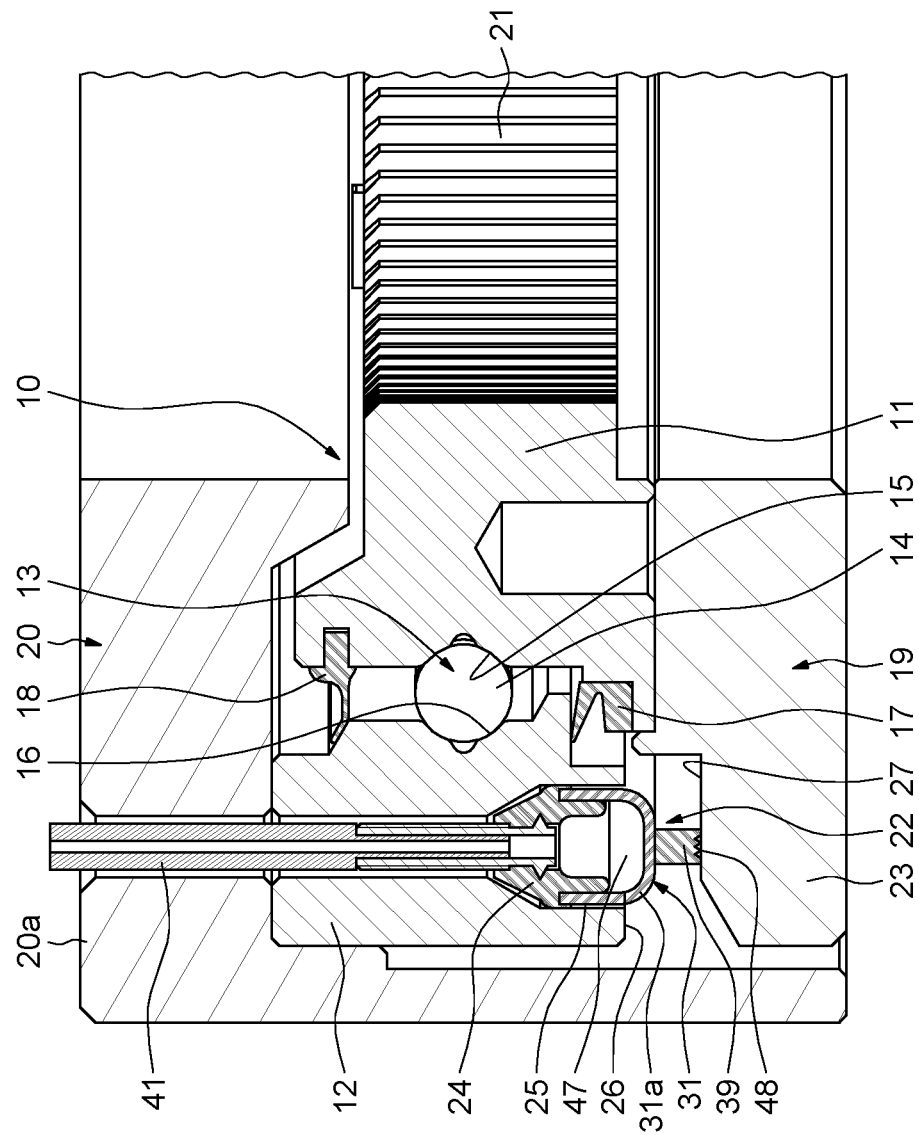
FIG. 2 shows a half-sectional view of the rolling bearing, corresponding to FIG. 1, the sealing device being in the deployed position.

As illustrated in FIGS. 1 and 2, a roller bearing 10, of large diameter, is used for example on a submersible vehicle, as a slewing bearing. The rolling bearing 10 includes an inner ring 11, an outer ring 12 and a row 13 of rolling elements 14 arranged between these rings 11 and 12. In the example shown, the rings 11 and 12 are in the form of concentric rings being rotatable relative to each other about an axis of rotation (not shown) of the bearing, the outer ring 12 surrounding at a distance the inner ring 11. The rolling elements 14 are balls partially engaged in ring raceways 15 and 16 opposite the rings 11 and 12. The annular space between the rings 11 and 12, wherein is disposed the row 13 of rolling elements 14, is closed axially on both sides by annular seals 17 and 18 for example carried by the inner ring 11 and in contact with the outer ring 12.

The inner ring 11 is intended to be fixed to the vehicle chassis, part 19 of which is visible on the figures. The outer ring is intended to be fixed on the turret of the vehicle, part 20 of which is visible on the figures. The inner ring 11 has an internal toothing 21 intended to mesh with gears to rotate the movable turret of the vehicle.

The rolling bearing 10 further includes an inflatable complementary sealing device, indicated generally by reference numeral 22, which is intended to constitute an additional sealing to the periphery of the annular seal 17 between the outer ring 12 and a peripheral portion 23 of the chassis 19 on which the inner ring 11 is mounted. The sealing device 22 is for example mounted on the outer ring 12 and includes a fixed annular part 24 installed in an annular groove 25 of the outer ring 12, arranged into a radial annular face 26 of the latter facing away from a radial annular face 27 of the chassis 19, the annular groove 25 being radially outward and away from the annular seal 17.

As illustrated more particularly on FIGS. 3 to 5, the fixed annular portion 24 is in the form of a U-shaped section member which includes a radial annular connecting branch 28 arranged against the radial annular bottom of the groove 25 (FIG. 3) and inner and outer cylindrical side flanges 29 and 30 spaced radially and extending in the direction of the radial face 27 of the portion 23 of the frame 19 at a distance from cylindrical sidewalls of the groove 25.

The sealing device 22 further includes a deformable annular portion 31 coupled to the fixed annular portion 24. The deformable annular portion 31 includes a deformable annular membrane 31a which is in the form of a profile which includes inner and outer cylindrical lateral wings 32 and 33 respectively located inside and outside of the flanges 29 and 30 of the fixed portion 24 and contiguous to the latter. The lateral wings 32 and 33 extend respectively between the lateral wings 29 and 30 of the annular fixed portion 24 and the opposite flanks of the groove 25 and have ends engaged in annular grooves 34 and 35 of the annular connecting branch 28 of the annular fixed portion 24, these grooves 34 and 35 being arranged on either side of the lateral wings 29 and 30.

The sealing device 22 is held in the groove 25 thanks to the fact that the annular connecting branch 28 of the stationary annular portion 24 is forcibly inserted between the opposite sides of the annular groove 25, squeezing the end portions of lateral wings 32 and 33 of the deformable annular membrane 31, taken in the grooves 34 and 35 of the fixed annular portion 24. The deformable annular membrane 31a further includes a central annular portion 36 joining its lateral wings 32 and 33. As illustrated more particularly in FIGS. 1, 3 and 4, this central portion 36 is capable of occupying a retracted position in which it envelops the ends of the lateral wings 29 and 30 of the stationary annular portion 24 and is introduced into the annular groove 37 of the fixed annular portion 24 formed between the lateral wings 29 and 30 of this annular fixed portion 24 and oriented axially towards the portion 23 of chassis 19.

In this retracted position, the central annular portion 36 of the deformable annular membrane 31a matches the shape of the annular groove 37 of the stationary annular portion 24 and forms an annular groove 38 axially directed towards the part 23 of the frame 19. According to another embodiment, the central annular portion 36 of the deformable annular membrane 31a may extend at a distance from the bottom and possibly the flanks of the annular groove 37 of the stationary annular portion 24. The deformable annular portion 31 further includes an annular contact member 39 integral to a median annular outer area of the central annular portion 36 of the deformable annular membrane 31a. In the retracted position, this annular contact member 39 is introduced, with lateral clearance, at least in part in the groove 38 formed by the central annular portion of the deformable annular membrane 31a inserted in the groove 37 of the fixed annular part 24.

According to the embodiment as shown in FIGS. 1, 3 and 4, the sealing device 22, in the retracted position, is completely within the outer ring 25 of the groove 12 with respect to the radial face 26 of the outer ring 12. It is thus protected. The sealing device 22 further includes means 40 for supplying a fluid such as a gas, between the stationary annular portion and the deformable annular portion.

This supplying means 40 includes an axial conduit 41 which extends through an axial passage 42 of the outer ring 12 and the end of which is sealingly engaged in an axial orifice or opening 43 arranged in a place through the radial annular connecting branch 28 of the fixed annular part 24.

As more specifically illustrated in FIGS. 3, 4 and 5, the radial annular connecting branch 28 may have a projecting portion 44 through which is fitted the axial orifice 43, an end portion of the axial conduit 41 having a peripheral rib 45 engaged in an internal annular groove 46 of the axial orifice 43.

Furthermore, as illustrated in FIGS. 1 and 2, the conduit 41 extends through a portion 20a of the frame 20 and its other end is connected to a source of pressurized fluid (not shown), e.g. air of the vehicle. According to one embodiment, this source of pressure could be carried by the outer ring 12.

When pressurized fluid is supplied through the axial conduit 41, the fluid enters an annular receiving chamber 47 formed between the stationary annular portion 24 and the annular membrane 31a of the deformable annular portion 31 and causes an axial or swelling axial expansion of the annular membrane 31a in the direction of the portion 23 of the chassis 19.

More specifically, the central annular portion 36 of the annular membrane 31a axially extracts out of the groove 37 of the fixed annular part 24 and expands axially beyond the annular radial face 26 of the outer ring 12, carrying with it the annular contact element 39, towards a limited deployed position in which a radial annular contact face 48 of the annular contact member 39 comes into contact on an annular zone of the radial face 27 of the portion 23 of the chassis 19, this annular zone being radially outward and away from the annular seal 17.

In this deployed position illustrated on FIGS. 2 and 5, the sealing device 22 extends around and at a distance from the annular seal 17. The annular central portion 36 of the annular membrane 31a has, for example, a section right in U. It is the pressure of the fluid in the annular chamber 47 which determines the pressure of the annular contact member 39 on the radial face 27 of the portion 23 of the frame 19. According to an alternative embodiment, the annular contact member 39 has, in its contact face 48, spaced apart from each other annular grooves 49. In this deployed position, a sealing is created between the outer ring 12 and the portion 23 of the frame 19, thanks to the tight fit of the fixed annular portion 24 into the groove 25 of the outer ring 12, to the annular membrane 31a, to annular contact member 39 and to the contact of the latter with the radial face 27 of the portion 23 of the chassis 19.

In addition, in this deployed position, the outer ring 12 and the frame 19 secured to the inner ring 11 can rotate with respect to each other. This rotation generates a friction between the annular contact member 39 and the radial face 27 of the portion 23 of chassis 19.

When the fluid pressure in the annular chamber 47 is released and the fluid discharged through conduit 41, the membrane 31a deforms in the opposite direction, toward its retracted position, by moving the annular contact member 39 away from the radial face 27 of the portion 23 of the frame 19. The retracted position described above can be achieved under the effect of a prior elastic deformation of the annular membrane 31a during its deformation toward its deployed position and/or under the effect a depression of the fluid in the annular chamber 47, created by an external pump.

Since the sealing device 22 is integrated, at least in part, in the outer ring 12, it does not cause any disadvantageous congestion.

The sealing device 22 can be brought into the deployed position only when needed, for example in the event of vehicle submergence or when the latter is in a polluted environment e.g. by gas or radiations.

When the sealing device 22 is in its retracted position and is thus not used, it does not degrade and does not generate any additional torque during the rotation of chassis 19 and 20 relative to each other through the roller bearing 10. According to another embodiment, the inner ring 11 may include an annular portion taking the place of the annular portion 23 of chassis 19, so that the seal 1 may be brought into contact on the annular portion of this ring.

According to an embodiment, the annular wings 32 and 33 of the membrane 31a of the deformable portion 31 may be in contact in the retracted position on the annular wings 29 and the fixed part 24 of bonded respectively on each other. The annular contact member 39 can be vulcanized on the central annular portion 38 of the membrane 31a. For example, the fixed portion 24 may be made of fabric silicone, the membrane 31a may be made of Kevlar fiber and the annular contact member 29 may be made of fabric silicone.

The present invention has been illustrated above by the description of a specific rolling bearing. Of course, the sealing device may be mounted in a bearing having a plurality of rows of rolling elements and different means for sealing the space in which the rolling elements move. The invention can also be applied to a bearing without rolling elements interposed between the rings, such as for a plain bearing or a ball joint. In addition, the inflatable sealing device may be arranged to move radially or obliquely.

The invention claimed is:

1. A bearing comprising:
an inner ring,
an outer ring, the inner ring and the outer ring being configured to rotate relative to each other about an axis of rotation, and
an inflatable sealing device mounted in a groove on one of the inner and outer rings and including:
a stationary annular portion having at least one orifice, the stationary annular portion comprising spaced annular wings and an annular connecting branch connecting the spaced annular wings to form an annular groove, each of the spaced annular wings having a first cylindrical surface facing the groove on the one of the inner and outer rings and a second cylindrical surface forming a part of the annular groove;
a deformable annular portion coupled to the stationary annular portion, the deformable annular portion being capable of deforming in a direction from a retracted position to a deployed position under the effect of a fluid introduced through the orifice, wherein in the retracted position the deformable annular portion contacts and overlies each of the first cylindrical surface and the second cylindrical surface of both the spaced annular wings, in the deployed position the deformable annular portion contacts and overlies the first cylindrical surface of both the spaced annular wings and no portion of the deformable annular portion is located within the annular groove; and
at least an annular chamber for receiving the fluid, into which the orifice opens, and being formed between the stationary annular portion and the deformable annular portion at least when the deformable annular portion is in the deployed position, wherein when the deformable annular portion is in the retracted position the inflatable sealing device is positioned completely within the groove, the deformable annular portion moving in a direction parallel to the axis of rotation when moving between the retracted position and the deployed position.

2. The bearing according to claim 1, wherein the deformable annular portion includes a deformable annular membrane.

3. The bearing according to claim 2, wherein the deformable annular portion includes an annular contact member secured to the deformable annular membrane.

4. The bearing according to claim 2, wherein the orifice being arranged in the annular connecting branch, and wherein the deformable annular membrane includes first and second ends configured to be clamped within respective first and second grooves located within the stationary annular portion.

5. The bearing according to claim 4, wherein a central annular portion of the deformable annular membrane is adapted to be engaged, in the retracted position, in the annular groove of the stationary annular portion and capable of being deployed axially outside the annular groove towards its deployed position.

6. The bearing according to claim 4, wherein the stationary annular portion is mounted in the groove on the one of the inner and outer rings, wherein the groove squeezes a first portion and a second portion of the stationary annular portion such that the first and second portions clamp the first and second ends of the deformable annular membrane, respectively, thereby coupling the deformable annular membrane to the stationary annular portion.

7. The bearing according to claim 1, wherein the inflatable sealing device includes a conduit having one end secured to the stationary annular portion and which is connected to the orifice.

8. The bearing according to claim 7, further comprising a fluid source connected to the conduit and mounted on the one of the inner and outer rings.

9. The bearing according to claim 1, wherein the inflatable sealing device is mounted in the groove on the outer ring, and wherein in the deployed position, the deformable annular portion is adapted to come into contact with one face of the inner ring.

10. An assembly of two parts connected by means of a bearing, the bearing having an inner ring, an outer ring, the inner ring and the outer ring being configured to rotate relative to each other about an axis of rotation, and an inflatable sealing device mounted on one of the inner and outer rings, the inflatable sealing device further comprising:
a stationary annular portion having at least one orifice, the stationary annular portion comprising spaced annular wings and an annular connecting branch connecting the spaced annular wings to form an annular groove, each of the spaced annular wings having a first cylindrical surface facing the groove on the one of the inner and outer rings and a second cylindrical surface forming a part of the annular groove;

a deformable annular portion coupled to the stationary annular portion, the deformable annular portion being capable of deforming in a direction from a retracted position to a deployed position under the effect of a fluid introduced through the orifice, wherein in the retracted position the deformable annular portion contacts and overlies each of the first cylindrical surface and the second cylindrical surface of both the spaced annular wings, in the deployed position the deformable annular portion contacts and overlies the first cylindrical surface of both the spaced annular wings and no portion of the deformable annular portion is located within the annular groove; and at least an annular chamber for receiving the fluid, into which the orifice opens, and being formed between the stationary annular portion and the deformable annular portion at least when the deformable annular portion is in the deployed position, wherein the deformable annular portion of the inflatable sealing device, secured to a first one of the two parts, is adapted to come, in the deployed position, in contact with an annular face of a second one of the two parts, wherein when the deformable annular portion is in the retracted position the inflatable sealing device us positioned completely within the groove, the deformable annular portion moving in a direction parallel to the axis of rotation when moving between the retracted position and the deployed position.

11. The bearing according to claim 1, wherein the orifice of the stationary annular portion comprises an internal annular groove therein, the inflatable sealing device further comprising a conduit extending through the orifice and being sealingly secured thereto, the conduit having an outwardly extending rib thereon that is located within the internal annular groove of the orifice of the stationary annular portion.

* * * * *